United States Patent [19]
Yoshimoto et al.

[11] Patent Number: 5,853,887
[45] Date of Patent: Dec. 29, 1998

[54] WHITE CONDUCTIVE POWDER, A PROCESS FOR ITS PRODUCTION AND A RESIN COMPOSITION CONTAINING THE POWDER

[75] Inventors: Akihiro Yoshimoto; Toshihiro Yoshinaga; Shigeru Nagaoka; Masayasu Morishita, all of Ube, Japan

[73] Assignee: Titan Kogo Kabushiki Kaisha, Yamaguchi-Ken, Japan

[21] Appl. No.: 681,484

[22] Filed: Jul. 23, 1996

Related U.S. Application Data

[63] Continuation of Ser. No. 264,574, Jun. 23, 1994, abandoned.

[30] Foreign Application Priority Data

Jun. 23, 1993 [JP] Japan ................................. 5-152227

[51] Int. Cl.$^6$ ............................................ B32B 5/16
[52] U.S. Cl. ........................ 428/404; 428/403; 428/323; 427/383.1; 427/383.3; 427/397.3; 427/419.2; 521/432; 521/847
[58] Field of Search ................................. 428/403, 404; 521/432, 897; 427/383.1, 383.3, 397.3, 419.2

[56] References Cited

U.S. PATENT DOCUMENTS 3,969,217 7/1976 Bommarajs et al. ............... 204/290 F
4,246,143 1/1981 Sonada et al. ....................... 252/518
4,457,973 7/1984 Matsui et al. ........................ 428/372

FOREIGN PATENT DOCUMENTS 60-253112 12/1985 Japan.
61-141618 6/1986 Japan.
5262526 10/1993 Japan.

*Primary Examiner*—E. Rollins Buffalow
*Attorney, Agent, or Firm*—Roylance, Abrams, Berdo & Goodman, L.L.P.

[57] ABSTRACT

The improved white conductive powder comprises white inorganic pigment particles the surfaces of which are coated with an electrically conductive layer of a dual structure consisting of a lower tin dioxide sub-layer and an upper tin dioxide-containing indium oxide sub-layer. To produce the powder, the hydration product of tin is deposited uniformly on the surfaces of white inorganic particles and, subsequently, an overcoat of indium oxide hydrate containing 0.1–20 wt % of tin dioxide is formed, followed by a heat treatment that is conducted at 350°–750° C. in a non-oxidizing atmosphere.

A resin composition containing this powder retains both the good conduction properties of a white conductive resin composition incorporating a conductive powder the particles of which are coated with antimony-doped tin dioxide and the high photostability of a white conductive resin composition incorporating an aluminum-doped conductive zinc oxide powder and yet the composition has a much higher degree of whiteness than either prior art resin composition.

15 Claims, 2 Drawing Sheets

× 120,000

× 120,000

WHITE CONDUCTIVE POWDER, A PROCESS FOR ITS PRODUCTION AND A RESIN COMPOSITION CONTAINING THE POWDER

This is a continuation of application Ser. No. 08/264,574 filed Jun. 23, 1994 now abandoned.

FIELD OF THE INVENTION

This invention relates to white conductive powders for use in electrically conductive or antistatic synthetic fibers, as well as in plastics and paints protected against static buildup. The invention also relates to a process for producing such white conductive powders, as well as resin compositions containing them.

Many of the currently used conductive or antistatic synthetic fibers, plastics and paints are formulated with carbon black, metal powders, etc. However, the black color of these constituent materials has limited the use of the final products. With a view to solving this problem, there have been proposed white conductive powders that comprise the particles of titanium dioxide, etc. coated with an antimony-doped tin oxide layer (see, Japanese Patent Public Disclosure (KOKAI) Nos. Sho 53-92854, 58-209002, etc.), as well as synthetic fibers, plastics and paints that are formulated with such white conductive powders (see, Japanese Patent Public Disclosure (KOKAI) Nos. Sho 56-169816, Hei 2-307911, etc.)

The synthetic fibers, plastics and paints that have the proposed white conductive powders added thereto have a much higher degree of whiteness than those formulated with carbon black, metal powders and other conventional materials. Yet, compared to the case of formulating titanium dioxide which is one of the most commonly used white pigments, the color of those synthetic fibers, plastics and paints is bluish black and still low in whiteness. As a further problem, the color of the antimony-doped tin dioxide changes to bluish black upon exposure to light, causing color shading in the surfaces of resins and paints that incorporate said antimony-doped tin dioxide.

Powders that are free from the problem of discoloration under light can be prepared by doping zinc oxide with aluminum (the product is called "conductive zinc oxide"). Resins and paints that are formulated with this conductive zinc oxide are preferable in that they experience only limited discoloration under light; on the other hand, they are inferior in conduction characteristics compared to conductive powders such as those of $TiO_2$ coated with antimony-doped tin dioxide; for example, their volume resistivity is about a hundred times as high as the value of "conductive titanium dioxide" powder. In addition, they have not been completely satisfactory in terms of whiteness.

Further, the toxicity of antimony is much discussed today and the use of antimony-free white conductive powders is on great demand.

Japanese Patent Public Disclosure No. Hei 4-154621 has proposed a non-antimony method but this is unable to produce a powder that has a comparable volume resistivity to antimony-containing powders.

Japanese Patent Public Disclosure No. Sho 61-141618 proposed potassium titanate coated with tin dioxide-containing indium oxide. However, to prepare this powder, an aqueous solution of indium chloride and an ethanol solution of stannous chloride were used separately and the failure to provide uniform coating ratios for the two compounds presented the problem of unstable volume resistivities. Further, the surfaces of substrate potassium titanate particles were coated only poorly with indium oxide and the substrate worked as an impurity to lower the conductivity of the coating layer. Hence, despite the increase in the coverage with tin oxide-containing indium oxide, the powder had a volume resistivity as high as $10^4 \Omega \cdot cm$.

Japanese Patent Public Disclosure No. Sho 60-253112 proposed muscovite coated with tin dioxide containing indium oxide. However, as in the case of the above-described potassium titanate, the coverage with tin dioxide-containing indium oxide was poor and this problem, coupled with the adverse effect of the substrate, required increasing the coverage with tin dioxide-containing indium oxide.

The same problems have been encountered in other prior art white inorganic pigment particles; it was difficult to achieve a uniform coat of tin dioxide-containing indium oxide and the failure to lower the volume resistivity due to the adverse effect of the substrate inorganic pigment particles made it impossible to produce white conductive powders having good conduction properties.

SUMMARY OF THE INVENTION

An object, therefore, of the present invention is to provide a white conductive powder that retains the good conduction properties of the conventional conductive powder coated with antimony-doped tin dioxide, as well as the high photostability of the conductive zinc oxide and which yet has a degree of whiteness comparable to that achieved by using common pigment-quality titanium dioxide.

Another object of the invention is to provide a resin composition containing the novel white conductive powder.

The present inventors conducted intensive studies in order to develop resin compositions that satisfied the requirements mentioned above and the present invention has been accomplished on the basis of these studies. Briefly stated, the invention provides, in one aspect, a white conductive powder that comprises white inorganic pigment particles the surfaces of which are coated with a conductive layer consisting of a lower tin dioxide sub-layer and an upper tin dioxide-containing indium oxide sub-layer. The invention provides, in another aspect, a white conductive composition having said white conductive powder Incorporated in a resin component.

DETAILED DESCRIPTION OF THE INVENTION

Figure 1:
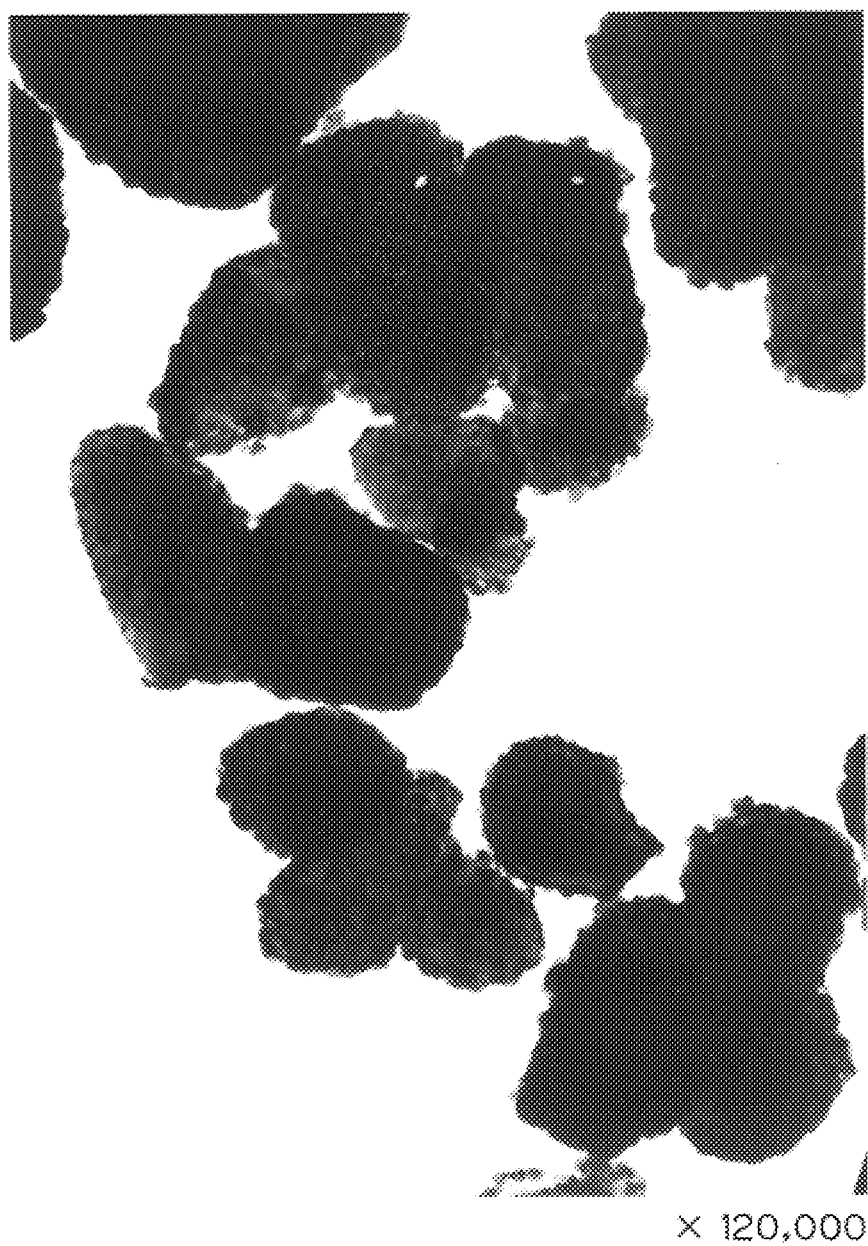
FIG. 1 is a transmission electron micrograph (×120,000) showing the structure of particles in the white conductive powder prepared in Example 1.

The white conductive powder according to the first aspect of the invention is prepared by a process comprising the steps of coating the surfaces of white inorganic pigment particles uniformly with 0.5–50 wt % of a tin dioxide hydrate as $SnO_2$ on the basis of the pigment, then applying an overcoat of 5–200 wt % of an indium oxide hydrate as $In_2O_3$ on the basis of the pigment, said indium oxide hydrate containing 0.1–20 wt % of a tin dioxide hydrate as $SnO_2$, and finally heating the thusly coated pigment particles in a non-oxidizing atmosphere at 350°–750° C.

The white inorganic pigment particles serving as the substrate of the white conductive powder of the invention may be of any commercial type selected from among titanium dioxide, aluminum oxide, silicon dioxide, zinc oxide, barium sulfate, zirconium oxide, alkali metal salts of titanic acid and muscovite. To take the particles of titanium dioxide as an example, their size is in no way limited and they may be spherical, acicular or in any other morphologies, and they may be anatase, rutile or even amorphous. While the present invention is primarily intended for use with white pigments but it should be noted that the inventive concept is also applicable to iron oxide and various other color pigments.

Before going into details of the invention, let us briefly explain the history to the development of the novel white conductive powder.

With a view to imparting conductivity to white inorganic pigments, the inventors first tried a method in which the surfaces of the particles were coated directly with an indium oxide hydrate containing a tin dioxide hydrate. However, this method was incapable of forming a uniform indium oxide hydrate coat over the surfaces of inorganic pigment particles and, in addition, the substrate pigment particles prevented themselves from being imparted good conductivity even when they were subjected to a heat treatment. To solve these problems, the inventors continued their studies and tried a process in which the surfaces of substrate inorganic pigment particles were first coated with a hydrate of a metal oxide such as zinc oxide or zirconium oxide which are conventionally used as coating materials and subsequently applied an overcoat of an indium oxide hydrate containing a tin dioxide hydrate. To their great surprise, the resulting coat was found to be uniform by examination with a transmission electron microscope. However, those metal oxides were still unsatisfactory in assuring good conductivity under the effects of the primer hydrate. The inventors then used a tin oxide hydrate in the primer coat and found that the resulting powder showed very good conduction properties without being effected by the substrate inorganic pigment particles or the primer tin oxide hydrate. The present invention has been accomplished on the basis of this finding. It should be noted here that the tin dioxide hydrate coat as the lower sub-layer may contain a small amount of indium oxide hydrate to the extent that will not impair the intended advantages of the invention.

The process for producing the white conductive powder of the invention is described below in detail.

The tin dioxide hydrate coat as the lower sub-layer can be formed by various methods, for example, by first adding a solution of a tin-salt or a stannate to an aqueous suspension of white inorganic pigment particles and then adding an alkali or an acid, or by adding a tin salt or a stannate and an alkali or an acid simultaneously for coating purposes. To insure that a tin oxide hydrate is coated uniformly over the surfaces of the white inorganic pigment particles, the method of simultaneous addition is more suitable. When adopting this approach, the aqueous suspension of pigment particles is preferably kept heated at 50°–100° C. For simultaneous addition of a tin salt or a stannate and an alkali or an acid, the pH is typically adjusted between 2 and 9. Since the tin dioxide hydrate has an isoelectric point at a pH of 5.5, it is important and preferable that the pH of the aqueous suspension be maintained at 2–5 or 6–9 and this insures that the hydration product of tin is deposited uniformly over the surfaces of the white inorganic pigment particles.

Exemplary tin salts that can be used include tin chloride, tin sulfate and tin nitrate. Exemplary stannates that can be used include sodium stannate and potassium stannate.

Exemplary alkalies that can be used include sodium hydroxide, potassium hydroxide, sodium carbonate, potassium carbonate, ammonium carbonate aqueous ammonia and ammonia gas; exemplary acids that can be used include hydrochloric acid, sulfuric acid, nitric acid and acetic acid.

The coating weight of the tin dioxide hydrate should be 0.5–50 wt %, preferably 1.5–40 wt % as $SnO_2$ on the basis of the substrate white inorganic pigment. If the coating weight is less than 0.5 wt % as $SnO_2$, a tin oxide-containing indium oxide hydrate cannot be applied to form a uniform overcoat and, furthermore, the effect of the substrate inorganic pigment particles becomes significant to increase the volume resistivity of the resulting powder. If the coating weight of the tin dioxide hydrate exceeds 50 wt % as $SnO_2$, an increased amount of the tin oxide hydrate will fail to adhere closely to the surfaces of the substrate inorganic pigment particles and the resulting coat tends to be non-uniform.

The upper sub-layer, or the coating of tin dioxide-containing indium oxide hydrate, can also be formed by various methods. However, in order to assure that the previously formed tin dioxide hydrate coat will not be dissolved, it is preferable to adopt a method in which a mixed solution of a tin salt and an indium salt is added simultaneously with an alkali for coating purposes. If this approach is taken, the aqueous suspension of pigment particles is preferably warmed at 50°–100° C. For simultaneous addition of the mixed solution and an alkali, the pH is typically adjusted between 2 and 9. Again, it is important and preferable to maintain the pH at 2–5 or 6–9 and this insures that the hydration products of tin and indium are deposited uniformly over the surfaces of the white inorganic pigment particles.

Starting tin materials may be selected from among tin chloride, tin sulfate, tin nitrate, etc. and starting indium materials may be selected from among indium chloride, indium sulfate, etc.

Tin dioxide should be added in an amount of 0.1–20 wt %, preferably 2.5–15 wt %, as $SnO_2$ on the basis of $In_2O_3$. The desired conductivity cannot be attained if the addition of tin dioxide is less than 0.1 wt % or greater than 20 wt % as $SnO_2$.

Indium oxide should be added in an amount of 5–200 wt %, preferably 8–150 wt %, as $In_2O_3$ on the basis of the substrate inorganic pigment particles. If the addition of indium oxide is less than 5 wt %, the desired conductivity cannot be attained. Even if the addition of indium oxide is greater than 200 wt % as $In_2O_3$, little improvement in conductivity is achieved and, on the contrary, the production cost is increased to cause diseconomy.

The term "conductive powder" as used herein means those powders which have volume resistivities of 1–500Ω·cm. As will be demonstrated in the examples that are given later in this specification, the present invention enabled the production of white conductive powders which, in terms of volume resistivity, were comparable to the conventional antimony-containing product ($\leq 100$Ω·cm) or even better than the later ($\leq 10$Ω·cm).

The heat treatment is preferably conducted in a non-oxidizing atmosphere at 350°–750° C. Heat treatment in a non-oxidizing atmosphere is effective in reducing the volume resistivity of powders by two or three orders of magnitude compared to the products heat treated in air.

The non-oxidizing atmosphere can be created by using an inert gas such as nitrogen, helium, argon or carbon dioxide. For industrial practice, the heat treatment may be performed with nitrogen gas being blown and this is not only economical but also instrumental to the production of conductive powders with consistent characteristics.

The heating temperature is generally in the range from 350° to 750° C., preferably from 400° to 700° C. The desired conduction characteristics are difficult to attain if the temperature is lower than 350° C. or higher than 750° C. If the heating time is too short, no effect is achieved by heating; if the heating time is unduly long, no commensurate increase in effectiveness will occur. Hence, the heating time is suitably in the range from about 15 min to about 4 h, preferably from about 1–4 h.

Any resin components can be used in the invention as long as they are commercial synthetic fibers, plastics, paints and other products that need be furnished with conductivity. Specific examples of the resins that can be used include polyalkyl resins such as polyethylene, polyvinyl resins such as polyvinyl chloride, polyester resins, nylon resins, acrylic resins, ABS resins, phenolic resins, urethane resins, silicone resins, epoxy resins, alkyd resins, melamine resins. The applicable resins may be thermoplastic or thermosetting. Mixtures of the above-listed resins, as well as halogen-substituted resins can also be used.

To produce conductive resin compositions, the resin component to be modified may be compounded with the white conductive powder by a suitable means such as a twin-screw kneader or hot rollers. Alternatively, a sand grinder or the like may be used to prepare a resin paint containing the white conductive powder, which paint is then coated onto a substrate to form a thin conductive or antistatic film. Since the conductive powder has a high degree of whiteness, a bright colored, conductive resin composition can be produced by using this powder In combination with colored pigments or paints.

If the use of conductive or antistatic fibers is intended, they may be formulated from compositions that have been produced by compounding the conductive powder into resins and this is preferable from the viewpoint of manufacturing practices or physical properties. If the purpose of using conductive resin compositions is to prevent static buildup on films, resin-made containers, wall materials, etc., the application of resin paints is preferred since this permits easy production at low cost.

The white conductive powder to be incorporated varies with the process for producing the intended conductive resin composition or with the desired conductivity and, hence, it need be adjusted in accordance with the specific use. If the composition is to be used for the purpose of preventing static buildup, it should not have a surface resistance higher than $10^8 \Omega/cm$ and this necessitates incorporating the white conductive powder in an amount of 20–80 wt %, preferably 30–70 wt %. If the content of the powder is less than 20 wt %, the final resin composition will have an unduly high surface resistance; if the powder content is more than 80 wt %, not only does the strength of the resin composition decrease but also the cost of its production will increase.

The present invention is described below in greater detail with reference to the following examples, which are given here for illustrative purposes only and are by no means intended to be limiting.

EXAMPLE 1

A hundred grams of rutile titanium dioxide (KR-310 of Titan Kogyo K.K.; specific surface area, 7 m$^2$/g) was dispersed in 1 L of water to prepare an aqueous suspension, which was warmed and held at 70° C. In a separate step, a solution was prepared by dissolving 11.6 g of stannic chloride (SnCl$_4$.5H$_2$O) in 100 ml of 2N HCl. This solution and 12 wt % aqueous ammonia were added simultaneously to the suspension over a period of about 40 min, with care taken to maintain a pH of 7–8. In another separate step, 36.7 g of indium chloride (InCl$_3$) and 5.4 g of stannic chloride (SnCl$_4$.5H$_2$O) were dissolved in 450 ml of 2N HCl. This solution and 12 wt % aqueous ammonia were dripped simultaneously to the suspension over a period of about 1 h, with care taken to maintain a pH of 7–8. After the end of dripping, the treated suspension was filtered and washed. The resulting cake of the treated pigment was dried at 110° C.

Subsequently, the dried powder was heat treated in a nitrogen gas stream (1 L/min) at 500° C. for 1 h to yield the desired white conductive powder.

The powder has a volume resistivity of 3.9Ω·cm. The coating on the surfaces of the particles was very uniform as shown by a transmission electron micrograph in FIG. 1.

EXAMPLE 2

A desired white conductive powder was produced by repeating the procedure of Example 1 except that the rutile titanium dioxide was replaced by aluminum oxide (AKP-30 of Sumitomo Chemical Co., Ltd.; specific surface area, 6 m$^2$/g) and that the amount of stannic chloride was increased from 11.6 g to 16.2 g. The powder had a volume resistivity of 8.2Ω·cm.

EXAMPLE 3

A desired white conductive powder was produced by repeating the procedure of Example 1 except on the following points: the rutile titanium dioxide was replaced by zinc oxide (zinc white of Mitsui Mining & Smelting Co., Ltd.); the amount of stannic chloride was increased from 11.6 g to 16.2 g, and the amounts of indium chloride and stannic chloride were increased from 36.7 g and 5.4 g to 51.3 g and 13.3 g. respectively. The powder had a volume resistivity of 39Ω·cm.

EXAMPLE 4

A desired white conductive powder was produced by repeating the procedure of Example 1 except that the rutile titanium dioxide was replaced by barium sulfate (B-50 of Sakai Chemical Industry Co., Ltd.) and that the amounts of Indium chloride and stannic chloride were reduced from 36.7 g and 5.4 g to 23.2 g and 4.7 g, respectively. The powder had a volume resistivity of 47Ω·cm.

EXAMPLE 5

A desired white conductive powder was produced by repeating the procedure of Example 1 except for the following: the rutile titanium dioxide was replaced by potassium titanate (HT-300 of Titan Kogyo K.K.; specific surface area, 3 m$^2$/g); the amount of stannic chloride was reduced from 11.6 g to 6.0 g; and the amounts of indium chloride and stannic chloride were reduced from 36.7 g and 5.4 g to 31.9 g and 4.7 g, respectively. The powder had a volume resistivity of 87Ω·cm.

EXAMPLE 6

A desired white conductive powder was produced by repeating the procedure of Example 1 except for the following: the rutile titanium dioxide was replaced by anatase ultrafine particulate titanium dioxide (STT-65C of Titan Kogyo K.K.; specific surface area, 60 m$^2$/g); the solution of stannic chloride (11.6 g) in 2N HCl (100 ml) was replaced by a solution of stannic chloride (39.8 g) in 2N HCl (300 ml); and the solution of indium (36.7 g) and stannic chloride (5.4 g) in 2N HCl (450 ml) was replaced by a solution of indium chloride (159.6 g) and stannic chloride (23.5 g) in 2N HCl (1000 ml). The powder had a volume resistivity of 42Ω·cm.

EXAMPLE 7

A desired white conductive powder was produced by repeating the procedure of Example 1 except that the rutile titanium dioxide was replaced by muscovite (SUZOLITE MIKA of Kuraray Co., Ltd.; specific surface area, 7 m$^2$/g). The powder had a volume resistivity of 22Ω·cm.

EXAMPLE 8

A desired white conductive powder was produced by repeating the procedure of Example 1 except for the following: the rutile titanium dioxide was replaced by zirconium oxide (high-strength zirconia of Tosoh Corp.; specific surface area, 17 m$^2$/g); the amount of stannic chloride was increased from 11.6 g to 23.2 g; the solution of indium chloride (36.7 g) and stannic chloride (5.4 g) in 2N HCl (450 ml) was replaced by a solution of indium chloride (73.4 g) and stannic chloride (10.8 g) in 2N HCl (900 ml). The powder had a volume resistivity of 32Ω·cm.

COMPARATIVE EXAMPLE 1

Figure 2:
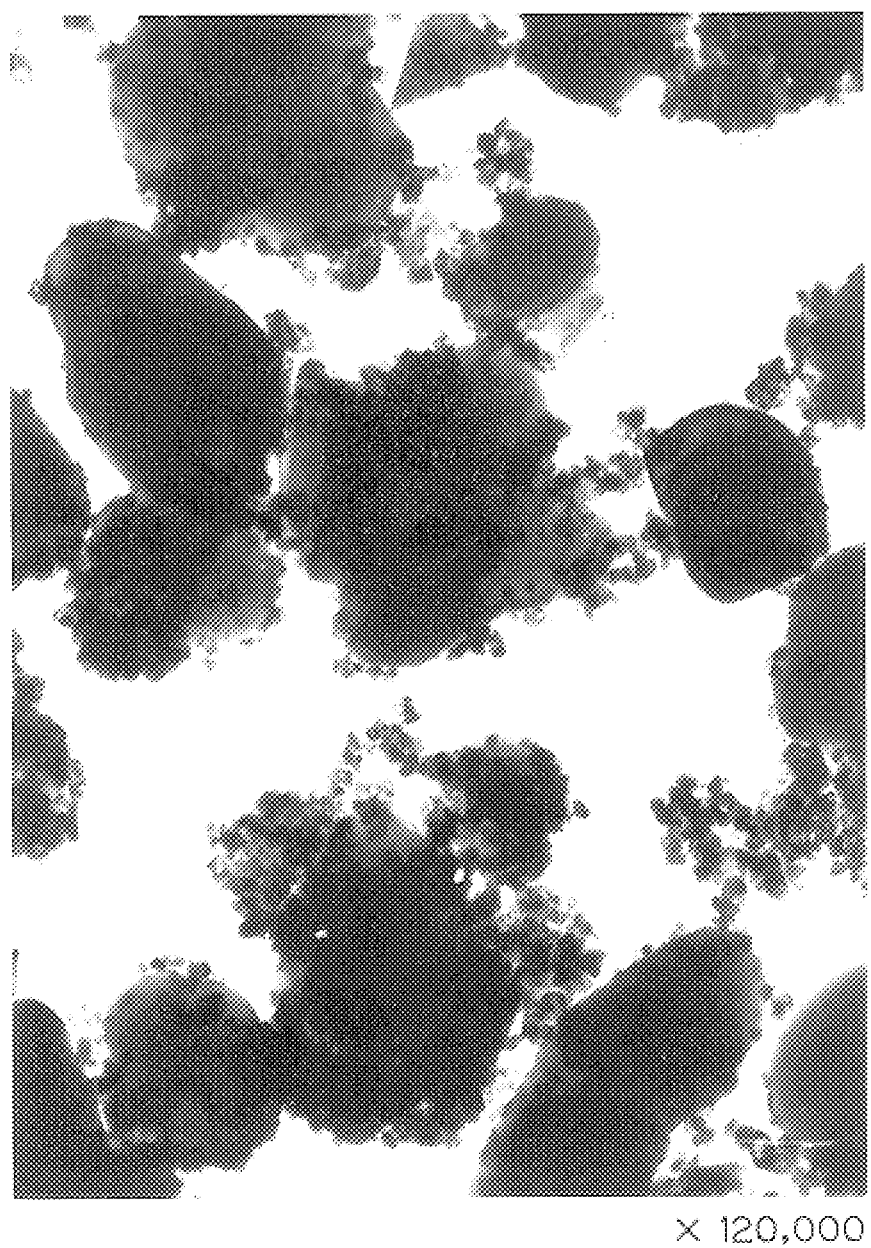
FIG. 2 is a transmission electron micrograph (×120,000) showing the structure of particles in the white conductive powder prepared in Comparative Example 1.

A comparative sample of white conductive powder was produced by repeating the procedure of Example 1 except that no treatment was conducted using the solution of stannic chloride (11.6 g) in 2N HCl (100 ml). The sample powder had a very high volume resistivity (3.9×10$^5$Ω·cm) and the coverage of the particles was such that the coating separated from the substrate in many areas as shown by a transmission electron micrograph in FIG. 2.

COMPARATIVE EXAMPLE 2

Another comparative sample of white conductive powder was produced by repeating the procedure of Example 1 except that the heat treatment was conducted in air rather than in a nitrogen gas stream. The sample powder also has a very high volume resistivity (4.3×10$^3$Ω·cm).

EXAMPLE 9

The white conductive powder produced in Example 1 was kneaded with a high-density polyethylene (SHOREX SS55008 of Showa Denko K.K.) using a twin-roller mill (Kansai Roll K.K.) at 170° C. for 2 min, yielding white conductive resin compositions. The compositions were shaped into sheets about 0.6 mm thick by means of a pressure molding machine heated at 180° C. The sheets were subjected to the measurement of various characteristics. In the preparation of the test sheets, the concentration of the white conductive powder was varied at 30 wt %, 50 wt % and 70 wt % by adjusting the relative proportions of the powder and the polyethylene resin at 30/70, 50/50 and 70/30 in grams.

The results of measurements are shown in Tables 1 and 2; Table 1 lists the colorimetric values and volume resistivities of the conductive resin compositions, and Table 2 lists the degree of color change or discoloration that occurred under light. The test specimens had high degrees of whiteness (L values) but experienced less discoloration (ΔE) under light, thus providing to be light-fast. It also had good conduction properties as evidenced by low volume resistivities.

Various physical properties were measured by the following methods.

(Colorimetry on resin sheets)

The resin sheets were subjected to colorimetry with a color tester (SC-2-CH of Suga Test Instruments Co., Ltd.)

(Discoloration under light)

A resin sheet was placed on top of the sample holder of the color tester and exposed to light from a light source for 10 min. Colorimetry was then conducted on the exposed sample and the measured values were subtracted from the initial (t=0 min) values (L, a, b). The differences ΔL, Δa, Δb and ΔE were used as indices of discoloration.

(Volume resistivity)

Each resin sheet was cut into square (1 cm×1 cm) strips, which were coated with conductive silver paste on both top and bottom surfaces and dried for 24 h. The electric resistance of each strip was measured with an LCR meter (model 4261A) or a high-resist meter (both by Yokogawa Hewlett-Packard, Ltd.) and the volume resistivity was calculated by the formula set forth below. The thickness of the resin sheet was measured exactly with an electronic micrometer (MH-100 of Shinko Denshi Co., Ltd.)

Volume resistivity (Ω · cm) =

$$\frac{\text{Measured value of electric resistance }(\Omega)}{\text{Thickness of resin sheet (cm)}} \times 1 \text{ (cm}^2\text{)}$$

COMPARATIVE EXAMPLE 3

Specimens of comparative white conductive resin composition were produced by repeating the procedure of Example 9 except that a commercial grade of white conductive titanium dioxide that was coated with antimony-doped tin dioxide (CTR-72 of Titan Kogyo K.K.; volume resistivity, 2.8Ω·cm) was used as the white conductive powder.

The results of measurements on the specimens are shown in Tables 1 and 2; Table 1 lists the colorimetric values and volume resistivities of the specimens, and Table 2 lists the degree of discoloration that occurred under light. The comparative specimens had satisfactorily low volume resistivities; however, compared to the sample of Example 9, they had low degrees of whiteness (L values) and experienced great discoloration (ΔE) under light; in particular, the drop in whiteness (ΔL) was substantial enough to produce a blue black spot in areas exposed to light.

COMPARATIVE EXAMPLE 4

Specimens of another comparative white conductive resin composition were produced by repeating the procedure of Example 9 except that aluminum-doped zinc oxide (conductive zinc oxide 23K of Hakusui Chemical Industry Co., Ltd.; volume resistivity, 187Ω·cm) was used as the white conductive powder.

The results of measurements on the specimens are shown in Tables 1 and 2; Table 1 lists the colorimetric values and volume resistivities of the specimens, and Table 2 lists the degree of discoloration that occurred under light. The discoloration that occurred in the specimens under light was very small, demonstrating their satisfactory light fastness. On the other hand, the degrees of whiteness (L values) were low and the volume resistivities were about two orders of magnitude high compared to the sample of Example 9.

TABLE 1

| | Powder's volume resistivity ($\Omega \cdot$ cm) | Pigment concentration | | | | | |
|---|---|---|---|---|---|---|---|
| | | 30 wt % | | 50 wt % | | 70 wt % | |
| Run | | L value | volume resistivity ($\Omega \cdot$ cm) | L value | volume resistivity ($\Omega \cdot$ cm) | L value | volume resistivity ($\Omega \cdot$ cm) |
| Example 9 | 3.9 | 91.5 | $7.9 \times 10^8$ | 90.8 | $5.8 \times 10^5$ | 90.2 | $9.0 \times 10^3$ |
| Comparative Example 3 | 2.8 | 81.1 | $7.7 \times 10^8$ | 79.0 | $5.0 \times 10^5$ | 77.4 | $8.6 \times 10^3$ |
| Comparative Example 4 | 187 | 84.4 | $5.6 \times 10^{10}$ | 83.7 | $2.8 \times 10^7$ | 82.3 | $1.0 \times 10^6$ |

TABLE 2

| | Light-induced discoloration in conductive resin composition containing 50 wt % pigment | | | |
|---|---|---|---|---|
| Run | $\Delta$L | $\Delta$a | $\Delta$b | $\Delta$E |
| Example 9 | −0.16 | −0.14 | −0.26 | 0.34 |
| Comparative Example 3 | −1.08 | −0.26 | −0.35 | 1.16 |
| Comparative Example 4 | −0.07 | 0.00 | −0.32 | 0.33 |

What is claimed is:

1. A white conductive powder comprising white inorganic pigment particles the surfaces of which are coated with an electrically conductive coating consisting of a lower layer and an upper layer wherein said lower layer consists essentially of tin dioxide and accounts for 0.5–50 wt % on the basis of the pigment, and wherein said upper layer contains 0.1–20 wt % of tin dioxide on the basis of $In_2O_3$, with the balance consisting essentially of indium oxide, and accounts for 5–200 wt % on the basis of the pigment.

2. A white conductive powder according to claim 1 wherein the white inorganic pigment particles are selected from the group consisting of titanium dioxide, aluminum oxide, silicon dioxide, zinc oxide, barium sulfate, zirconium oxide, alkali metal salts of titanic acid and muscovite.

3. A white conductive powder according to claim 1 wherein the white inorganic pigment particles are those of titanium dioxide.

4. A process for producing a white conductive powder comprising white inorganic pigment particles the surfaces of which particles are coated with an electrically conductive coating consisting of a lower layer and an upper layer wherein said lower layer consists essentially of tin dioxide and accounts for 0.5–50 wt % on the basis of the pigment, and wherein said upper layer contains 0.1–20 wt % of tin dioxide on the basis of $In_2O_3$, with the balance consisting essentially of indium oxide, and accounts for 5–200 wt % on the basis of the pigment, which comprises the step of;

coating the surfaces of the white inorganic pigment particles with a lower layer which lower layer accounts for 0.5–50 wt % of a tin dioxide hydrate as $SnO_2$ on the basis of the pigment;

then applying an upper layer of an indium oxide hydrate containing 0.1–20 wt % of a tin dioxide hydrate as $SnO_2$, indium oxide hydrate containing said tin dioxide hydrate being applied in an amount of 5–200 wt % as $In_2O_3$ on the basis of the pigment; and performing a heat treatment in a non-oxidizing atmosphere.

5. A process according to claim 4 wherein the heat treatment is performed at 350°–750° C.

6. A process according to claim 5 wherein the heat treatment is conducted with an inert gas being blown.

7. A process according to claim 6 wherein the inert gas is nitrogen gas.

8. A process according to claim 6 wherein the white inorganic pigment is selected from the group consisting of titanium dioxide, aluminum oxide, silicon dioxide, zinc oxide, barium sulfate, zirconium sulfate, zirconium oxide, alkali metal salts of titanic acid and muscovite.

9. A process according to claim 8 wherein the white inorganic pigment is titanium dioxide.

10. A process according to claim 9 wherein the lower layer is formed by adding a tin salt or a stannate and an alkali or an acid simultaneously to an aqueous suspension of the white inorganic pigment particles.

11. A process according to claim 10 wherein the aqueous suspension is kept warmed at 50°–100° C. during the simultaneous addition of a tin salt or a stannate and an alkali or an acid.

12. A process according to claim 11 wherein the aqueous suspension is held at a pH of 2–9 during the simultaneous addition of a tin salt or a stannate and an alkali or an acid.

13. A conductive resin composition comprising a white conductive powder and a resin, said conductive powder comprising white inorganic pigment particles the surfaces of which are coated with an electrically conductive layer consisting of a lower layer and an upper layer wherein said lower layer consists essentially of tin dioxide and accounts for 0.5–50 wt % on the basis of the pigment, and wherein said upper layer contains 0.1–20 wt % of tin dioxide on the basis of $In_2O_3$ with the balance consisting essentially of indium oxide, and accounts for 5–200 wt % on the basis of the pigment.

14. A conductive resin composition according to claim 13 which further contains colored pigments or dyes added thereto.

15. A conductive resin composition according to claim 14 wherein the resin component is high-density polyethylene.

* * * * *

UNITED STATES PATENT AND TRADEMARK OFFICE
CERTIFICATE OF CORRECTION

PATENT NO. : 5,853,887
DATED : December 29, 1998
INVENTOR(S) : Yoshimoto, et al

It is certified that error appears in the above-identified patent and that said Letters Patent is hereby corrected as shown below:

On the title page, item [73] Assignee: should read -- Titan Kogyo Kabushiki Kaisha, Yamaguchi-ken, Japan --

Signed and Sealed this

Tenth Day of August, 1999

Attest:

Q. TODD DICKINSON

*Attesting Officer*  *Acting Commissioner of Patents and Trademarks*